US012617227B2

(12) United States Patent
Chen et al.

(10) Patent No.: US 12,617,227 B2
(45) Date of Patent: *May 5, 2026

(54) METHODS OF WATER TRANSFER PRINTING

(71) Applicant: YIHAO NANOMETER TECHNOLOGY CO., LTD., Tainan City (TW)

(72) Inventors: Tien-Shui Chen, Tainan City (TW); Chi-Liang Chen, Tainan City (TW)

(73) Assignee: YIHAO NANOMETER TECHNOLOGY CO., LTD., Tainan City (TW)

( * ) Notice: Subject to any disclaimer, the term of this patent is extended or adjusted under 35 U.S.C. 154(b) by 85 days.

This patent is subject to a terminal disclaimer.

(21) Appl. No.: 18/809,376

(22) Filed: Aug. 20, 2024

(65) Prior Publication Data

US 2024/0408911 A1     Dec. 12, 2024

Related U.S. Application Data

(63) Continuation of application No. 17/502,306, filed on Oct. 15, 2021, now Pat. No. 12,097,724, which is a continuation-in-part of application No. 16/419,202, filed on May 22, 2019, now abandoned.

(30) Foreign Application Priority Data

Aug. 14, 2018     (TW) .................................. 107128296

(51) Int. Cl.
*B44C 1/175*        (2006.01)
*B32B 27/30*        (2006.01)

(52) U.S. Cl.
CPC ............ *B44C 1/175* (2013.01); *B32B 27/306* (2013.01); *B32B 2307/728* (2013.01); *Y10T 428/24802* (2015.01)

(58) Field of Classification Search
CPC ..... B44C 1/175; B44C 1/1758; B32B 27/306; B32B 2307/728; Y10T 428/24802
See application file for complete search history.

(56) References Cited

U.S. PATENT DOCUMENTS

2021/0060992 A1*   3/2021   Cai ..................... C09D 175/04

FOREIGN PATENT DOCUMENTS

JP        2004018776 A  *  1/2004

OTHER PUBLICATIONS

Machine English translation of JP-2004018776-A, accessed Jan. 6, 2026 (Year: 2004).*

* cited by examiner

*Primary Examiner* — Abbas Rashid
*Assistant Examiner* — Adrianna N Konves
(74) *Attorney, Agent, or Firm* — Idea Intellectual Limited; Sam T. Yip

(57) ABSTRACT

A method of water transfer printing is provided. The method including the following operations. A water transfer printing film is received. An information body is transferred to a printing substrate without use of an organic solvent-containing activator prior to transferring the information body. The water transfer printing film includes a superabsorbent film, a water-based resin layer on the superabsorbent film, the water-based resin layer, and the information body on the water-based resin layer. The information body includes a water-based colorant and a water-based resin.

10 Claims, 8 Drawing Sheets

S001 —

Prepare a superabsorbent film.

S002 —

Coat a water-based modified
acrylic copolymer resin onto the
superabsorbent film to form a
water-based modified acrylic
copolymer resin layer.

S003 —

Set an information body on the
water-based modified acrylic
copolymer resin layer.

METHODS OF WATER TRANSFER PRINTING

PRIORITY CLAIM AND CROSS-REFERENCE

This application is a continuation application of allowed U.S. patent application Ser. No. 17/502,306, filed on Oct. 15, 2021, and which is a continuation-in-part application of U.S. patent application Ser. No. 16/419,202, filed on May 22, 2019, which claims priority to TW Patent Appl. No. 107128296, filed on Aug. 14, 2018.

FIELD OF THE INVENTION

The present invention relates to an eco-friendly activator-free water transfer printing film and its transfer printing method, in particular to a water transfer printing process that can be carried out without using any activator to avoid environmental pollutions and prevent jeopardizing human health or deforming the transfer printing pattern.

BACKGROUND OF THE INVENTION

In water transfer printing technology, an ink coating is printed on a water-soluble resin film to form texts and patterns, and the water-soluble resin film is set on a water surface, and then an activator is provided for dissolving and hydrolyzing the water-soluble resin film into an isolated state, and a transfer object is pressed onto the water-soluble resin film in water in order to transfer the texts and patterns on a surface of the transfer object, and then the transfer object is washed by water and dried before attaching the texts and patterns onto the surface of the transfer object securely.

However, the activator used for the water transfer printing is an organic solvent which discharges volatile organic compounds (VOC) during the manufacture, transportation and use of water transfer printing films and may damage the environmental ecology and jeopardize the health of related personnel. Since conditions such as the spray speed, uniformity, concentration, and recipe of the activator have substantial impacts on the solubility of the printed texts and patterns on the water-soluble resin film, and the printing process may lead to deformations due to the factors such as the uniform solution, and reaction force produced during the spray coating, and all these will affect the precision, aesthetic look, and production yield of the water transfer printing.

In the present market, solvent based inks are used and printed on PVA films, and the PVA films will swell slowly and dissolve when exposed to water, but the ink layer is oil soluble and will not be swollen or dissolved by water, so that an activator (with an organic mixed solvent) must be added before the ink can be used. Therefore, the prior art has the following drawbacks: 1. The activator is mixed with water to cause water pollution and environmental pollution. 2. The activator (with the organic mixed solvent) is easily flammable and has fire safety issue. 3. Operators preparing and using the activator are required.

In view of the aforementioned drawbacks of the conventional water transfer printing, the inventor of the present invention based on years of experience in the related industry to conduct extensive research and experiment, and finally provided the present invention to overcome the drawbacks of the prior art.

SUMMARY OF THE INVENTION

Therefore, the primary objective of the present invention is to overcome the aforementioned drawbacks of the prior art by providing an eco-friendly activator-free water transfer printing film, comprising: a water-based modified acrylic copolymer resin layer, set on a superabsorbent film and mainly formed by a water-based modified acrylic copolymer resin, and the water-based modified acrylic copolymer resin comprising an acrylic copolymer emulsion, a polyvinyl alcohol (PVA) resin and a polyvinylpyrrolidone (PVP) resin, and the water-based modified acrylic copolymer resin layer being provided for crosslinking an end surface of the water-based modified acrylic copolymer resin layer after the other end of the superabsorbent film absorbs water and becomes softened; and an information body, set on the water-based modified acrylic copolymer resin layer.

In the eco-friendly activator-free water transfer printing film, the superabsorbent film is made of polyvinyl alcohol (PVA).

In the eco-friendly activator-free water transfer printing film, the water-based modified acrylic copolymer resin layer comprises an acrylic copolymer emulsion of 23 wt % to 45 wt %, a polyvinyl alcohol (PVA) resin of 15 wt % to 20 wt %, a polyvinylpyrrolidone (PVP) resin of 15 wt % to 20 wt %, polyethylene glycol of 1 wt % to 2 wt %, calcium carbonate of 5 wt % to 10 wt %, and water of 18 wt % to 40 wt %.

In the eco-friendly activator-free water transfer printing film, the water-based modified acrylic copolymer resin layer further comprises fatty alcohol polyoxyethylene ether of 0.2 wt % to 0.6 wt %, and N,N dimethylethanolamine of 0.2 wt % to 0.6 wt %, a water-based defoamer of 0.3 wt % to 0.6 wt %, and an aqueous dispersant of 0.3 wt % to 0.6 wt %.

In the eco-friendly activator-free water transfer printing film, the information body is a water-based ink and the water-based ink is a mixture of a water-based color cream and a water-based modified acrylic copolymer resin.

In the eco-friendly activator-free water transfer printing film, the water-based modified acrylic copolymer resin has a weight percentage falling within a ranue from 50 wt % to 65 wt % and the water-based ink has a weight percentage falling within a range from 35 wt % to 50 wt %.

In the eco-friendly activator-free water transfer printing film, the information body is a laser coating with a metal material.

In summation, the present invention has the following advantages and effects:

1. When the water transfer printing film of the present invention is set on a water surface, the superabsorbent film absorbs water to become softened, and it can be crosslinked directly with the water-based modified acrylic copolymer resin layer without requiring any activator to produce its adhesiveness, so as to allow an information body to be transferred and printed onto an object by water transfer printing, and achieve the effects of saving the material cost of the activator and preventing polluting the environment, jeopardizing human health, or deforming the transferred pattern due to the use of the activator. This invention has the environmental protection effect and improves the efficiency and production yield of water transfer printing.

2. After the object is washed after the desired texts and patterns are printed on the surface of the object by water transfer printing, the superabsorbent film is water-soluble, so that the superabsorbent film can be washed away and dissolved, and after the water-based modified acrylic copolymer resin layer is crosslinked, reacted and transferred onto the object, a protective film can be formed, and it will not be washed away or dissolved by water easily, so that the information body can be protected and printed onto the surface of the object. As a result, the present invention still has a good water transfer printing quality even without using the activator.

3. The whole superabsorbent film of the present invention is set on the water surface, so that the whole superabsorbent film and the water-based modified acrylic copolymer resin layer can be crosslinked at the same time, and the patterns, texts or their combination formed by the information object will not be deformed easily. This invention can improve the precision and aesthetic look of the water transfer printing.

DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
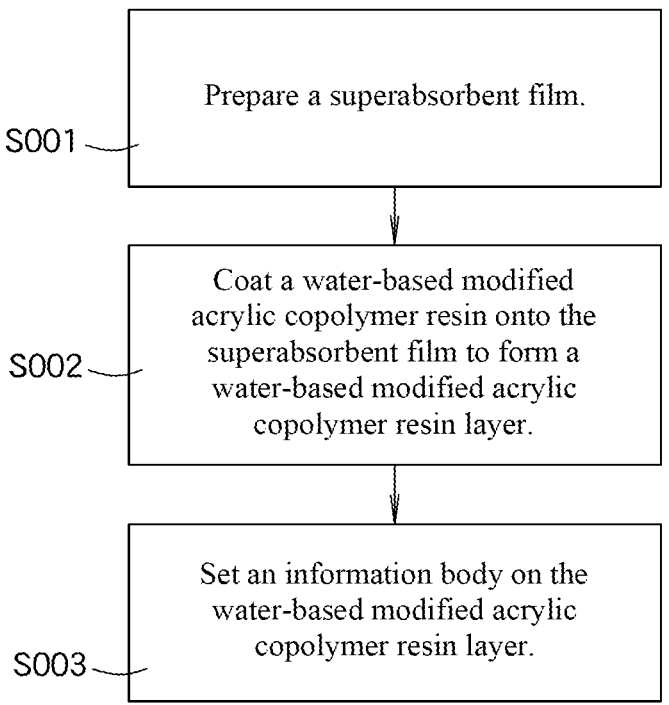
FIG. 1 is a flow chart of the manufacturing of the present invention.
Figure 2:
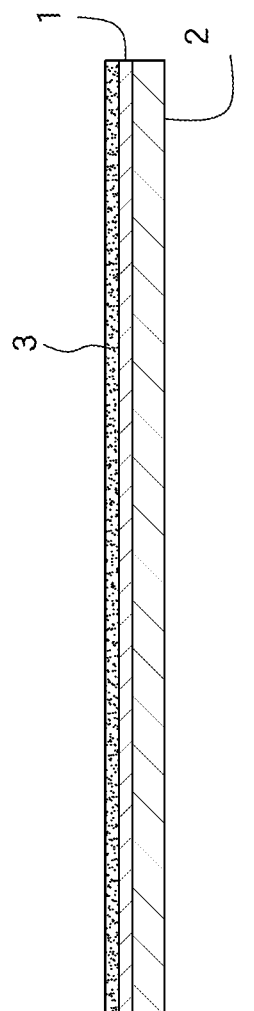
FIG. 2 is a schematic view showing the structure of a first embodiment of the present invention.

With reference to FIGS. 1 and 2 for an eco-friendly activator-free water transfer printing film in accordance with the first embodiment of the present invention, the eco-friendly activator-free water transfer printing film includes:

a water-based modified acrylic copolymer resin layer 1, set on a superabsorbent film 2, wherein the superabsorbent film 2 has a strong water absorbent property, and an embodiment of the superabsorbent film 2 is made of polyvinyl alcohol (PVA) to improve the crosslinking effect of the superabsorbent film 2, and in a preferred embodiment, the superabsorbent film 2 further includes a polyvinyl alcohol (PVA) emulation resin and a surfactant;

the water-based modified acrylic copolymer resin layer 1 is formed by a water-based modified acrylic copolymer resin which includes an acrylic copolymer emulsion, a polyvinyl alcohol (PVA) resin and a polyvinylpyrrolidone (PVP) resin, and the water-based modified acrylic copolymer resin layer 1 is provided for crosslinking an end surface of the superabsorbent film 2 with the water-based modified acrylic copolymer resin layer 1 after the other end surface of the superabsorbent film 2 absorbs water and becomes softened; specifically, the water-based modified acrylic copolymer resin layer 1 is made of a water-based modified acrylic copolymer resin that includes 23 wt % to 45 wt % of an acrylic copolymer emulsion, 15 wt % to 20 wt % of a polyvinyl alcohol (PVA) resin, 15 wt % to 20 wt % of a polyvinylpyrrolidone (PVP) resin, 1 wt % to 2 wt % of a polyethylene glycol, 5 wt % to 10 wt % of calcium carbonate, and 18 wt % to 40 wt % of water; preferably, the water-based modified acrylic copolymer resin layer 1 further includes 0.2 wt % to 0.6 wt % of fatty alcohol polyoxyethylene ether, 0.2 wt % to 0.6 wt % of N,N dimethylethanolamine, 0.3 wt % to 0.6 wt % of water-based defoamer, and 0.3 wt % to 0.6 wt % of aqueous dispersant to improve the stability of the water-based modified acrylic copolymer resin layer 1; and an information body 3, set on the water-based modified acrylic copolymer resin layer 1, and configured according to user requirements, wherein in an embodiment, the information body 3 is a water-based ink, which is a mixture of a water-based color cream and a water-based modified acrylic copolymer resin and the water-based modified acrylic copolymer resin is the same as the compound for forming the water-based modified acrylic copolymer resin layer 1, and the water-based ink is the aforementioned ink used for forming the information with patterns, texts or their combination by coating or printing; and in another embodiment, the information body 3 can also be a stacked layer having a laser coating with a metal material or a laser layer with a metal material and the aforementioned water-based ink.

The manufacturing method of the present invention includes the following steps:

S001: Prepare a superabsorbent film 2, which is a conventional PVA film.

S002: Coat the aforementioned water-based modified acrylic copolymer resin fully onto a superabsorbent film 2 to form a water-based modified acrylic copolymer resin layer 1.

S003: Set an information body 3 on the water-based modified acrylic copolymer resin layer 1, wherein the information body 3 of this embodiment is a water-based ink for printing one or more layers of patterns according to the product specification and the proportion of the water-based color cream and the water-based modified acrylic copolymer resin in the information body 3 after the ink is dried, and in an embodiment, the water-based modified acrylic copolymer resin has a weight percentage from 50 wt % to 65 wt %, and the water-based color cream has a weight percentage from 35 wt % to 50 wt %, and the water-based color cream and water-based modified acrylic copolymer resin are formed into the water-based ink.

Figure 3:
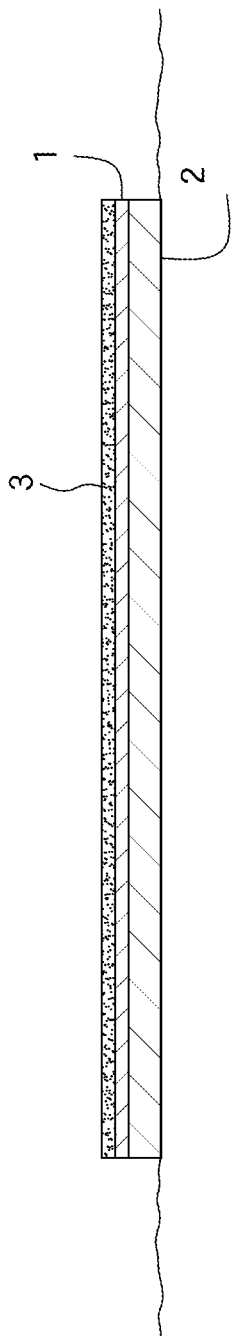
FIG. 3 is a schematic view showing a using status of the first embodiment of the present invention when set on a water surface.
Figure 4:
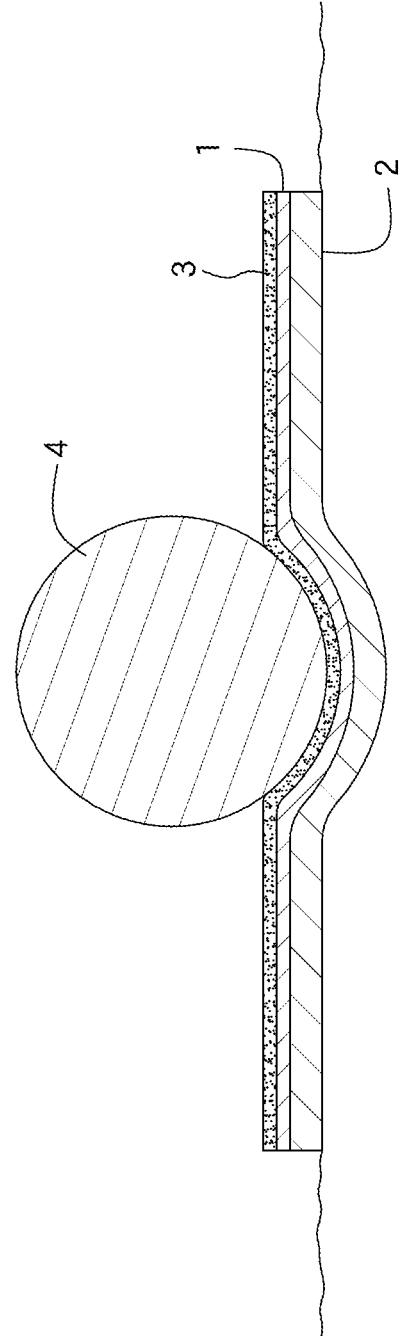
FIG. 4 is a schematic view showing a using status of the first embodiment of the present invention, when a water transfer printing of an object is performed.
Figure 5:
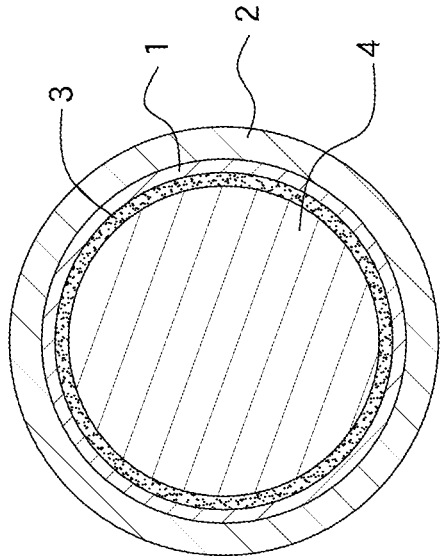
FIG. 5 is a schematic view showing a using status of the first embodiment of the present invention, after a water transfer printing of an object is performed.
Figure 6:
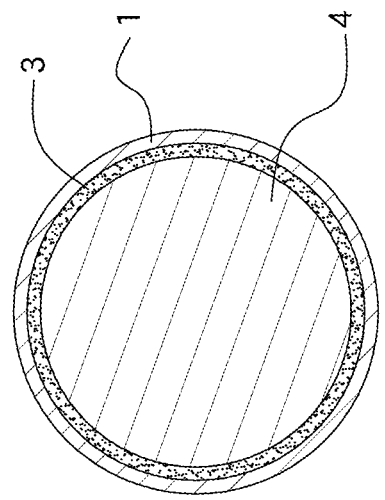
FIG. 6 is a schematic view showing a using status of the first embodiment of the present invention, after the object processed by the water transfer printing is washed by water to separate a superabsorbent film.

After the water transfer printing film of the present invention is manufactured, it is necessary to carry out the water transfer printing process as shown in FIG. 3. The superabsorbent film 2 is set on a water surface, so that the superabsorbent film 2 will absorb water and swell. With the material of the water-based modified acrylic copolymer resin layer 1, after the superabsorbent film 2 absorbs water and swells, the water-based modified acrylic copolymer resin layer 1 disposed at the other end surface is crosslinked for approximately 10 to 60 seconds, and the crosslinked superabsorbent film 2 and water-based modified acrylic copolymer resin layer 1 will produce an adhesiveness, and the information body 3 also has the water-based modified acrylic copolymer resin, so that after water swells and permeates through the superabsorbent film 2 and the water-based modified acrylic copolymer resin layer 1, the information body 3 also has the adhesiveness. As shown in FIG. 4, an object 4 can be pressed in a direction towards an end surface of the water-based modified acrylic copolymer resin layer 1 into water, and the information body 3, the water-based modified acrylic copolymer resin layer 1 and the superabsorbent film 2 can print the information body 3 onto the object 4 according to the contour of the object 4 as shown in FIG. 5, and then the object 4 is washed by water as shown in FIG. 6. Since the superabsorbent film 2 is water soluble, therefore the superabsorbent film 2 can be softened, dissolved and washed away in the washing process, and after the water-based modified acrylic copolymer resin is printed, a protective layer will be formed and will not be washed away by water, and subsequent processes such as baking will be carried out, so that the information body 3 can be printed onto the object 4 securely in the water transfer printing process.

In summation of the description above, the present invention makes use of the material properties of the water-based modified acrylic copolymer resin layer 1 to crosslink the superabsorbent film 2 with the water-based modified acrylic copolymer resin layer 1 without the need of using any activator, and the synchronous softening allows the information body 3 to be transferred and printed on the object 4, so as to improve the transfer efficiency of the water transfer printing and omit the use of the activator to achieve the effects of preventing environmental pollutions, protecting the health of personnel. In addition, the whole superabsorbent film 2 is set on the water surface, so that the whole water-based modified acrylic copolymer resin layer 1 can be crosslinked with the superabsorbent film 2, and the patterns, texts or their combination of the information body 3 will not be deformed easily. Therefore, this invention can improve the precision, aesthetic appearance and production yield of the water transfer printing.

Figure 7:
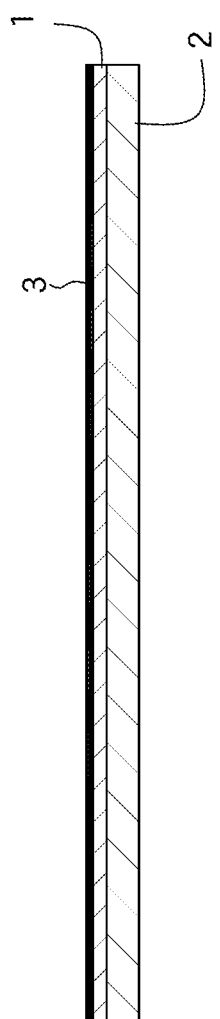
FIG. 7 is a schematic view showing the structure of a second embodiment of the present invention.
Figure 8:
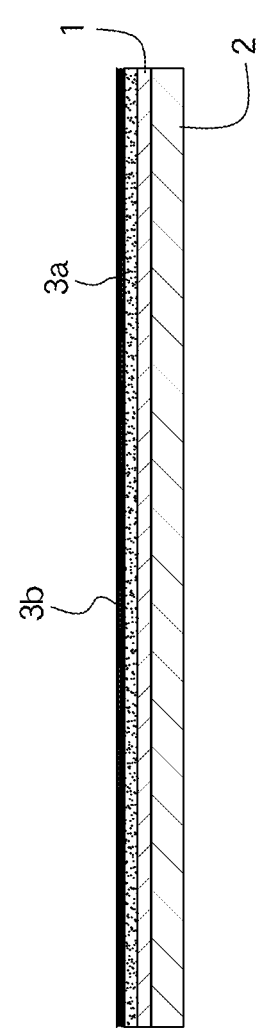
FIG. 8 is a schematic view showing the structure of a third embodiment of the present invention.

With reference to FIG. 7 for the second embodiment of the present invention, this embodiment uses a laser coating as the information body 3. In the aforementioned step S003, the water-based modified acrylic copolymer resin layer 1 is baked and dried, and a hot engraving or hot pressing roller is used to form the required laser pattern, and then a layer of metal coating (such as aluminum or zinc sulfide) is coated on the surface of the water-based modified acrylic copolymer resin layer 1 to form the laser pattern, and complete the whole manufacturing process. In the aforementioned water transfer printing process, when the water transfer printing film of the present invention is set on the water surface, the superabsorbent film 2 will absorb water, swell and crosslink with the water-based modified acrylic copolymer resin layer 1, making it adhesive. It is noteworthy that the coated aluminum of zinc sulfide is in the form of particles, but not in the form of particles instead of flakes, so that when the water-based modified acrylic copolymer resin layer 1 absorbs water and swells, it will be permeated into the information body 3 to soften the metal coating, so as to achieve the effect of transferring and printing the information body 3 onto the surface of the object 4. In the subsequent washing process, the superabsorbent film 2 can also be dissolved and peeled off, and the water-based modified acrylic copolymer resin layer 1 will also form a protective layer as described above, so that the information body 3 of the laser coating can be reliably transferred and printed onto the object 4.

In the third embodiment of the present invention, the information body 3 is a layer of water-based color cream and laser coating capable of producing more diversified visual effects. Based on the first embodiment, the information body 3a configured to be the water-based ink is formed, and then another information body 3b configured to be a laser coating is set on the information body 3a, and the water transfer printing is the same as described in the previous embodiments. When the water transfer printing film of the present invention is set on water surface, the superabsorbent film 2 will absorb water, swell and crosslink with the water-based modified acrylic copolymer resin layer 1 to make it sticky, and water will be permeated continuously though the information body 3a and information body 3b, and then the object 4 is pressed into water as described above, so that the information body 3a and information body 3b can be transferred and printed onto the surface of the object 4, and the water-based modified acrylic copolymer resin layer 1 will form a protective layer. When the subsequent washing process is carried out, the superabsorbent film 2 will be dissolved and washed away by water. Subsequent processes such as baking and drying are performed to complete the transfer and printing of the information body 3a and information body 3b. In the manufacturing process of the third embodiment, the aforementioned direct method is adopted, but in other embodiments, an indirect method can also be adopted, wherein a laser pattern can be formed by engraving and hot pressing an oriented polypropylene (OPP) or polyethylene terephthalate (PET) film, so that the information body 3b (which is a laser coating) can be formed, and then the information body 3a being the water-based ink 1 and the water-based modified acrylic copolymer resin layer 1 are coated, and finally the water-based modified acrylic copolymer resin layer 1, and the information body 3a, 3b are detachably attached onto the superabsorbent film 2 by heating to form the water transfer printing film of the present invention, and the using method of the water transfer printing film is the same as described above, and thus will not be repeated.

What is claimed is:

1. A method of water transfer printing, the method comprising:

receiving a water transfer printing film, the water transfer printing film comprises:

a superabsorbent film;

a water-based resin layer on the superabsorbent film, the water-based resin layer is formed from a composition comprising an acrylic copolymer emulsion of 23 wt % to 45 wt %, a polyvinyl alcohol (PVA) resin of 15 wt % to 20 wt %, a polyvinylpyrrolidone (PVP) resin of 15 wt % to 20 wt %, a polyethylene glycol of 1 wt % to 2 wt %, a calcium carbonate of 5 wt % to 10 wt %, and a water of 18 wt % to 40 wt % followed by drying; and an information body on the water-based resin layer, wherein the information body comprises a water-based colorant and a water-based resin; and transferring the information body to a printing substrate without use of an organic solvent-containing activator prior to transferring the information body.

2. The method according to claim 1, wherein the superabsorbent film comprises polyvinyl alcohol (PVA).

3. The method according to claim 1, wherein the water-based resin layer further comprises a fatty alcohol polyoxyethylene ether of 0.2 wt % to 0.6 wt %, a N,N dimethylethanolamine of 0.2 wt % to 0.6 wt %, a water-based defoamer of 0.3 wt % to 0.6 wt %, and an aqueous dispersant of 0.3 wt % to 0.6 wt %.

4. The method according to claim 1, wherein the information body further comprises a first information body comprising a water-based ink formed on the water-based resin layer and a second information body comprising a laser coating formed over the first information body.

5. The method according to claim 1, wherein the water-based resin of the information body has a weight percentage falling within a range from 50 wt % to 65 wt % of the information body and the water-based colorant has a weight percentage falling within a range from 35 wt % to 50 wt % of the information body.

6. A method of water-based transfer printing, the method comprising:

providing a water transfer printing film having a super-absorbent film, a water-based resin layer positioned on the superabsorbent film, and a water-based information layer on the water-based resin layer;

placing the water transfer printing film on a water surface such that the superabsorbent film absorbs water to become softened, the water permeates through the superabsorbent film, the water-based resin layer, and reaches the water-based information layer to produce adhesiveness in the water-based information layer; and transferring the water-based information layer onto an object without the use of an organic-solvent based activator prior to the transferring.

7. The method according to claim 6, wherein the water-based resin layer is formed from a composition comprising an acrylic copolymer emulsion of 23 wt % to 45 wt %, a polyvinyl alcohol (PVA) resin of 15 wt % to 20 wt %, a polyvinylpyrrolidone (PVP) resin of 15 wt % to 20 wt %, a polyethylene glycol of 1 wt % to 2 wt %, a calcium carbonate of 5 wt % to 10 wt %, and a water of 18 wt % to 40 wt % followed by drying.

8. The method according to claim 6, further comprising removing the superabsorbent film by a washing operation performed on the object with water after the transferring operation.

9. The method according to claim 8, further comprising a baking operation performed on the object after the washing operation.

10. The method according to claim 9, further comprising forming a protective layer over a surface of the object after the washing operation and prior to the baking operation.

\* \* \* \* \*